C. W. SALADEE
Carriage-Spring.
No. 18,865.
Patented Dec. 15, 1857.
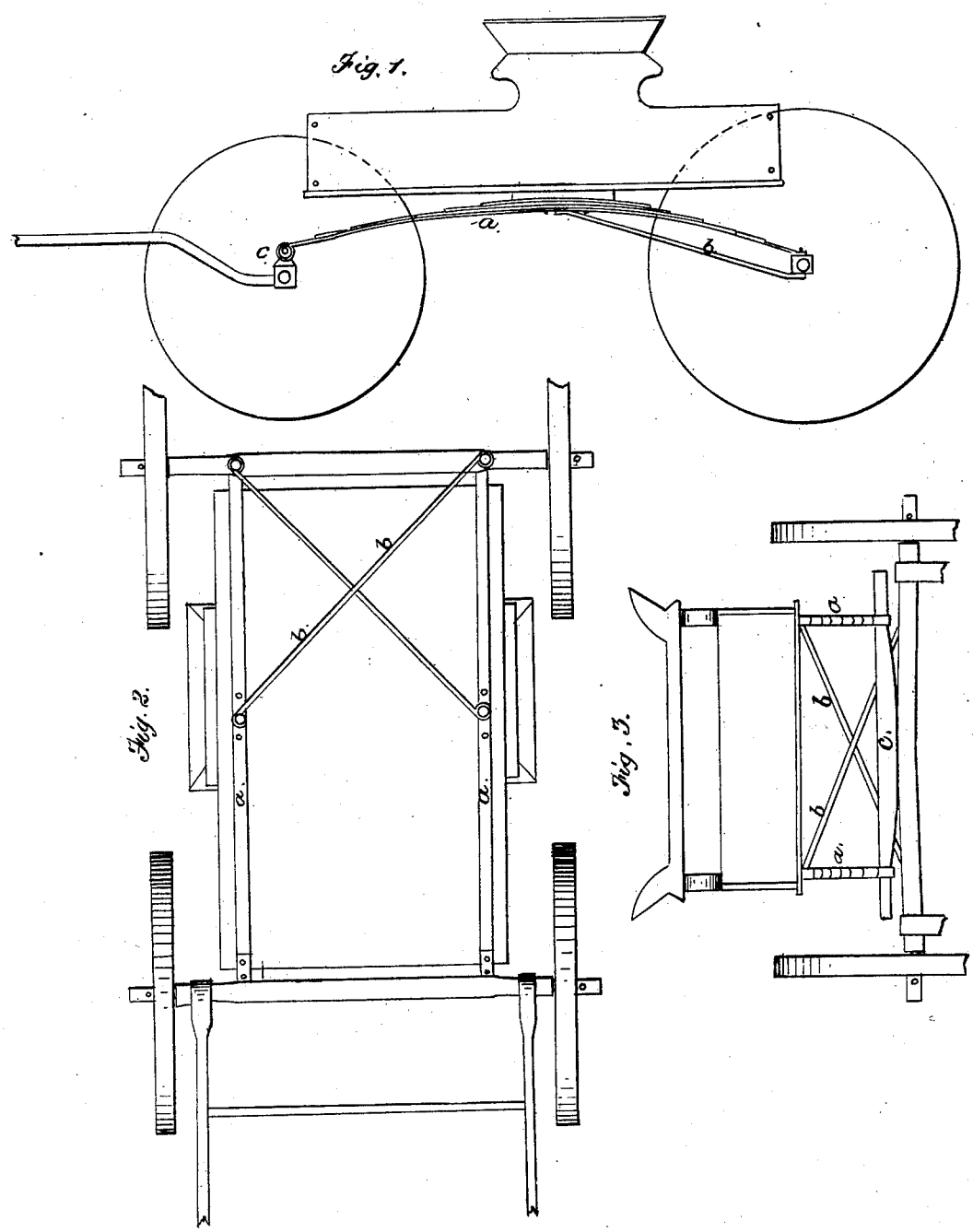

UNITED STATES PATENT OFFICE.

C. W. SALADEE, OF COLUMBUS, OHIO.

IMPROVEMENT IN BRACING SPRINGS OF VEHICLES.

Specification forming part of Letters Patent No. 18,865, dated December 15, 1857.

*To all whom it may concern:*

Be it known that I, C. W. SALADEE, of Columbus, in the county of Franklin and State of Ohio, have invented a new and useful Improvement in Light Four-Wheeled Pleasure Vehicles or Buggies; and I do hereby declare that the following is a full and exact description thereof, reference being had to the accompanying drawings, making a part of this specification.

Figure 1 is a side view of my improved vehicle minus the two hithermost side wheels; Fig. 2, a view of the under side of said vehicle, and Fig. 3 a front elevation of the same.

Similar letters indicate like parts in each figure.

My improvement in four-wheeled vehicles is applicable to that description of vehicles whose bodies are supported upon side springs and to those only whose side springs serve the additional purpose of connecting the hind axle with the bolster on the forward axle of said vehicles. This description of vehicles as heretofore constructed has been found to run very badly, owing to the oscillatory motion imparted to the hind axle by the unequal action of the side springs when a greater weight is thrown upon one spring than upon the other, and also when either of the hind wheels strikes against obstructions in the roadway. The aforesaid oscillatory movement of the hind wheels of the class of vehicles referred to, as a matter of course, causes the wheels on said axle to form serpentine tracks instead of tracking accurately after the forward wheels of said vehicle. The injurious effects produced by the said serpentine movements of the hind wheels of a vehicle are too palpable to require pointing out.

I have discovered that the aforesaid defect in the class of side-spring vehicles can be perfectly remedied by combining the central portion of each of the springs $a\ a$ with the hind axle by means of diagonal tension-rods $b\ b$, which cross each other at or near the central portion of each rod, substantially as shown in the accompanying drawings, and this constitutes the invention which I desire to secure by Letters Patent. The diagonal tension-rods $b\ b$, it will be perceived, preserve the parallelism of the springs $a\ a$ at the same time that they prevent the hind axle from being thrown out of its true position—viz., a position at right angles to the line of draft.

The rear ends of the springs $a\ a$ are permanently combined with the hind axle, and the forward ends of said springs are combined to the bolster $c$ over the front axle by means of eyes formed at said ends, which embrace journals at each end of the bolster. This method of securing the said springs to the bolster enables the shafts to be permanently secured to the forward axle and prevents the turning movements of said axle from exerting any influence upon the springs.

The permanent attachment of the shafts to the forward axle, in conjunction with the aforesaid method of combining the bolster with the side springs, prevents every particle of the rattling noise at the connections of said parts, which is a very valuable consideration.

Having thus fully described my improvement in side-spring pleasure-vehicles, what I claim therein as new, and desire to secure by Letters Patent, is—

The combination of the central portions of the side springs $a\ a$ with the hind axle by means of the diagonal tension-rods $b\ b$, substantially in the manner and for the purpose herein set forth.

The above specification of my improvement in pleasure-vehicles signed and witnessed this 11th day of November, 1857.

C. W. SALADEE.

Witnesses:
   I. R. STEBBERTS,
   A. MOOR.